US 9,250,876 B2

(12) United States Patent
Pistoia et al.

(10) Patent No.: US 9,250,876 B2
(45) Date of Patent: Feb. 2, 2016

(54) BUILDING REUSABLE FUNCTION SUMMARIES FOR FREQUENTLY VISITED METHODS TO OPTIMIZE DATA-FLOW ANALYSIS

(71) Applicant: International Business Machines Corporation, Armonk, NY (US)

(72) Inventors: Marco Pistoia, Amawalk, NY (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/010,758

(22) Filed: Aug. 27, 2013

(65) Prior Publication Data

US 2015/0067660 A1 Mar. 5, 2015

(51) Int. Cl.
*G06F 9/45* (2006.01)
*G06F 11/36* (2006.01)
*G06F 21/56* (2013.01)
*G06F 21/57* (2013.01)

(52) U.S. Cl.
CPC .............. *G06F 8/433* (2013.01); *G06F 21/577* (2013.01); *G06F 11/3604* (2013.01); *G06F 21/562* (2013.01)

(58) Field of Classification Search
None
See application file for complete search history.

(56) References Cited

U.S. PATENT DOCUMENTS

| | | | | |
|---|---|---|---|---|
| 5,396,627 A * | 3/1995 | Iitsuka | ..................... | G06F 8/433 717/156 |
| 7,289,947 B2 * | 10/2007 | Ammons | ........................ | 703/22 |
| 7,392,545 B1 * | 6/2008 | Weber | .................... | G06F 21/577 705/51 |
| 7,555,418 B1 | 6/2009 | Qadeer et al. | | |
| 7,757,219 B2 | 7/2010 | Ball et al. | | |
| 2005/0278183 A1 * | 12/2005 | Ammons | .......................... | 705/1 |
| 2007/0168550 A1 * | 7/2007 | Wang et al. | .................... | 709/238 |
| 2008/0178156 A1 * | 7/2008 | Kahlon | .................... | G06F 8/433 717/126 |
| 2011/0078511 A1 * | 3/2011 | Sinha | ................... | G06F 11/3604 714/38.1 |
| 2011/0238945 A1 * | 9/2011 | Ryu et al. | ....................... | 711/171 |
| 2014/0090070 A1 * | 3/2014 | Tripp | ..................... | G06F 21/577 726/25 |
| 2014/0130154 A1 * | 5/2014 | Dolby | .................... | G06F 21/577 726/22 |
| 2014/0157420 A1 * | 6/2014 | Guarnieri | .............. | G06F 21/562 726/25 |

OTHER PUBLICATIONS

Fedyukovich, G., et al., eVolCheck: Incremental Upgrade Checker for C, Lecture Notes in Computer Science, vol. 7795, Mar. 16-24, 2013, pp. 292-307, [retrieved on Oct. 8,2014], Retrieved from the Internet: <URL:http://link.springer.com/chapter/10.1007%2F978-3-642-36742-7_21>.*

Godefroid, P., Compositional Dynamic Test Generation, Jul. 14, 2006, 12 pages, [retrieved on Oct. 9, 2014], Retrieved from the Internet: <URL:http://cm.bell-labs.com/who/god/public_psfiles/smart.pdf>.*

(Continued)

*Primary Examiner* — Thuy Dao
*Assistant Examiner* — Geoffrey St Leger
(74) *Attorney, Agent, or Firm* — Harrington & Smith (57) ABSTRACT

A method includes inspecting function summaries generated during a static analysis of a program and identifying a set of function summaries for a same method that have structural similarities. The method includes replacing the set of structurally similar summaries with a coarse summary. The method further includes using the coarse summary in subsequent static analysis operations. Apparatus and program products are also disclosed.

10 Claims, 5 Drawing Sheets

(56) References Cited

OTHER PUBLICATIONS

Jetley, R. P., et al., Static Analysis of Medical Device Software using CodeSonar, Proceedings of the 2008 workshop on Static analysis, 2008, pp. 22-29, [retrieved on Oct. 11, 2014], Retrieved from the Internet: <URL:http://dl.acm.org/>.*

Aiken, A., et al., An Overview of the Saturn Project, Proceedings of the 7th ACM SIGPLAN-SIFSOFT workshop on Program analysis for software tools and engineering, 2007, pp. 43-48, [retrieved on Sep. 21, 2015], Retrieved from the Internet: <URL:http://dl.acm.org/>.*

Sery, O., et al., FunFrog: Bounded Model Checking with Interpolation-Based Function Summarization, Lecture Notes in Computer Science, 2012, pp. 203-207, [retrieved on Oct. 8, 2014], Retrieved from the Internet: <URL:http://link.springer.com/chapter/10.1007%2F978-3-642-33386-6_17>.*

D'Souza, "Interprocedural Analysis: Sharir-Pnueli's Functional Approach" Sep. 14, 2012.

Sharir, "Two Approaches to Interprocedural Data Flow Analysis", Summary by Suchant Jain, 2001.

Sharir, "Two Approaches to Interprocedural Data Flow Analysis", Computer Science Department, New York University, Department of Computer Science, Technical Report, Report No. 002, Sep. 1978.

Reps, "Precise Interprocedural Dataflow Analysis via Graph Reachability", POPL 1995.

Sharir, "Two Approaches to Interprocedural Data Flow Analysis, Part Two: The Call String Approach", presentation, 2010.

Tripp, "Andromeda: Accurate and Scalable Security Analysis of Web Applications", Fundamental Approaches to Software Engineering, Lecture Notes in Computer Science vol. 7793, 2013, pp. 210-225.

* cited by examiner

BUILDING REUSABLE FUNCTION SUMMARIES FOR FREQUENTLY VISITED METHODS TO OPTIMIZE DATA-FLOW ANALYSIS

BACKGROUND

This invention relates generally to analysis of program code and, more specifically, relates to static analysis of program code.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Static security analysis is a specific form of data flow analysis that analyzes program code without execution of the program code. Instead, model(s) are made of the program code and those models are analyzed. For instance, an input program may be modeled as an interprocedural control-flow graph with certain privileged nodes:

Source nodes are statements reading (untrusted) user-provided data;

Sink nodes are statements performing security-sensitive operations; and

Finally, downgrader nodes are statements endorsing the user-provided input (e.g., turning untrusted data to trusted data) either by sanitizing the input or by validating the input. Untrusted data is typically referred to as being potentially tainted (e.g., as in an operating program, the data may not actually be tainted but is assumed to be potentially tainted for analysis).

An exemplary goal of static security analysis is to find data-flow paths extending from sources to sinks that do not go through downgraders. The implication is that untrusted data is able to reach a security-sensitive operation without first being endorsed.

The only practical way of carrying out static security analysis is by applying a functional approach to interprocedural analysis. See M. Sharir and Amir Pnueli, "Two Approaches to Interprocedural Data Flow Analysis", Technical Report, New York University, 1978. Specific polynomial algorithms—like the IFDS (Interprocedural, Finite, Distribution, Subset) framework—are used by commercial solutions for security analysis. An IFDS framework is described in T. Reps, S. Horwitz, and M. Sagiv, "Precise Interprocedural Dataflow Analysis via Graph Reachability", POPL 1995.

The main idea of functional—or summary-based—interprocedural analysis is to create a reusable input-output summary for the target method for the specific data flow fact flowing into the method. That is, the summary may be reused each time the target method is called. This form of memorization is useful and effective in one of the two following cases:

1. The domain of data flow facts is small.
2. The domain is potentially large, but the method behaviors demonstrated during analysis are constrained.

Unfortunately, static security analysis has neither of these properties in general. The domain is exponential in the program size, and the method behaviors examined by the analysis are in some cases are very wide and varied.

BRIEF SUMMARY

The following summary is merely intended to be exemplary. The summary is not intended to limit the scope of the claims.

In an exemplary embodiment, a method includes inspecting function summaries generated during a static analysis of a program and identifying a set of function summaries for a same method that have structural similarities. The method includes replacing the set of structurally similar summaries with a coarse summary. The method further includes using the coarse summary in subsequent static analysis operations. Apparatus and program products are also disclosed.

BRIEF DESCRIPTION OF THE SEVERAL VIEWS OF THE DRAWINGS

FIG. 4, including

DETAILED DESCRIPTION

As stated above, static security analysis has neither the property of the domain of data flow facts is small or the domain is potentially large, but the method behaviors demonstrated during analysis are constrained. The domain is exponential in the program size, and the method behaviors examined by the analysis are in some cases very wide and varied.

This causes the performance of the analysis to degrade significantly, operating multiple times on the same method, each time generating a different summary for that method per the data flow fact currently under consideration.

Figure 1:
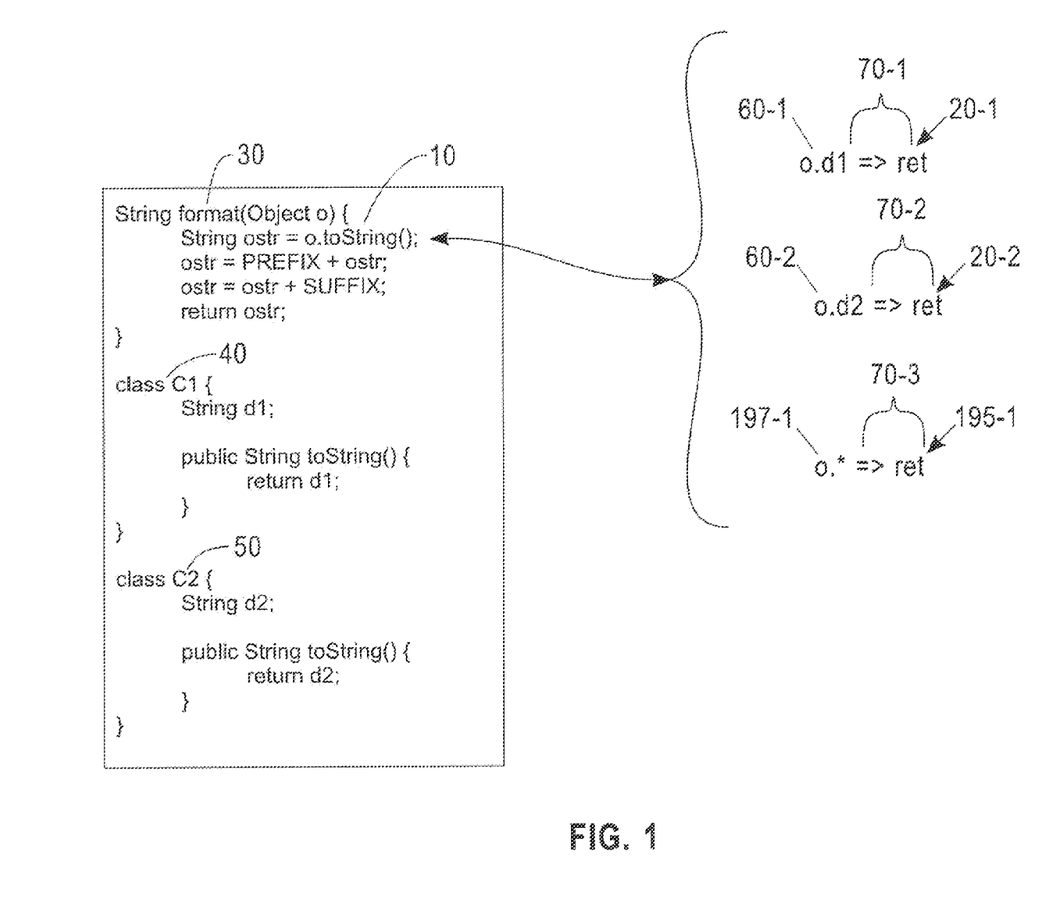
FIG. 1 is a simple example of program code used to illustrate a problem with current techniques for using functional summaries of methods in static analysis.

To illustrate this problem, consider the simple example in FIG. 1. This example is written in Java syntax. Java is a programming language and computing platform first released by Sun Microsystems in 1995. In the example of FIG. 1, different "tainted" objects yield different summaries. The summary depends on the (transitive) fields flowing into the result of the toString call 10 for the format method 30.

For an object of type C1 40 flowing into the format method 30, one could have the following summary:

o.d1=>ret.

This is the summary 20-1, which includes the data flow fact 60-1 of "o.d1" and a summary portion 70-1. Similarly, for an object of type C2 50, the following summary would arise:

o.d2=>ret.

This is the summary 20-1, which includes the data flow fact 60-2 of "o.d2" and a summary portion 70-2.

As mentioned above, methods such as the above can potentially "explode" the data flow solution (in the example above, corresponding to o.d1=>ret and o.d2=>ret), yielding a large number of data flow solutions that could be approximated as the simple and concise summary:

o.*=>ret (see reference 195-1), which asserts that if there is an untrusted object reachable from the local variable o, then the result is untrusted (and should therefore be tracked by the data flow engine). The two data flow facts have been made coarsened by the revised data flow fact 197-1 of "o.*", while the summary portion 70-3 is the same as the portions 70-1 and 70-2. The asterisk ("*") means "any field". For example, if o's class declares two fields, f and g, then o.* means {o.f, o.g}.

To reduce or eliminate this problem, a novel optimization of (interprocedural) data flow engines is proposed herein. An exemplary idea is to identify situations where there are too many summaries for a given method, and apply abstraction to these summaries, such that the following occur:

1. memory footprint is reduced; and
2. precision remains high.

This is a significant optimization, relative to conventional systems, improving the scalability of the analysis dramatically while retaining high precision.

Figure 2:
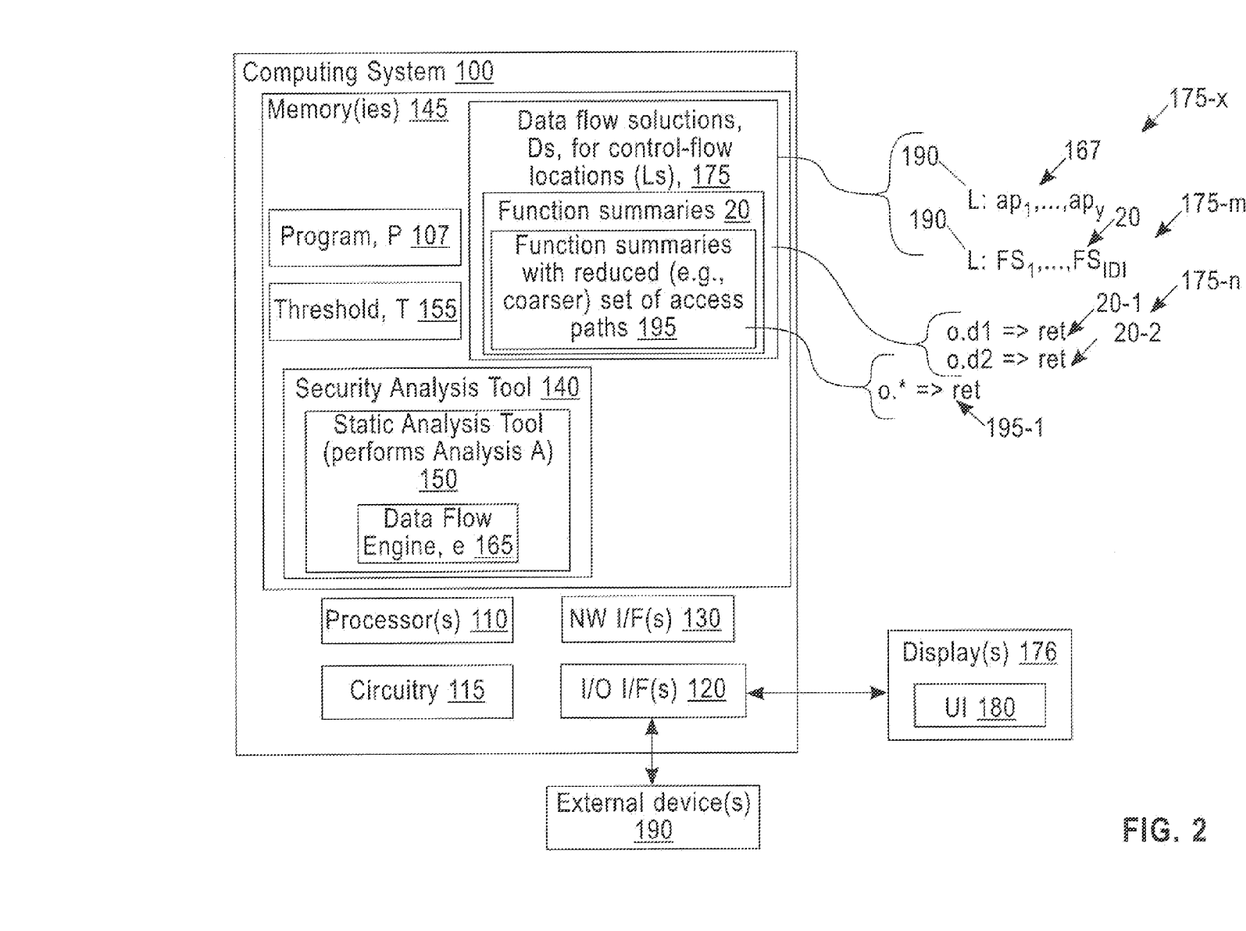
FIG. 2 is a block diagram of an example of a system suitable for performing the exemplary embodiments herein.

Additional description of the exemplary embodiments is presented in reference to the figures. Referring to FIG. 2, this figure provides an overview of a computing system 100 suitable for use with exemplary embodiments herein. The computing system 100 comprises one or more memories 145, one or more processors 110, one or more I/O interfaces 120, and one or more wired or wireless network interfaces 130. Alternatively or in addition to the one or more processors 110, the computing system 100 may comprise circuitry 115. The computing system 100 is coupled to or includes one or more displays 176 and one or more external device(s) 190. In one example, a program, P 107 a threshold T 155, a set of data flow solutions 175 and a security analysis tool 140 exist in the one or more memories 145. The security analysis tool 140 includes a static analysis tool 150 (which performs an analysis A) and a data flow engine e 165. The security analysis tool 140, in an exemplary embodiment, is implemented computer-readable program code that is executable by the one or more processors 110 to cause the computing system 100 to perform one or more of the operations described herein. In another example, the operations may also be performed, in part or completely, by circuitry 115 that implements logic to carry out the operations. The circuitry 115 may be implemented as part of the one or more processors 110 or may be separate from the one or more processors 110. The processors 110 may be any processing units, such as digital signal processors and/or single-core or multi-core general purpose processors. The circuitry 115 may be any electronic circuit such as an application specific integrated circuit or programmable logic. The memories 145 may comprise non-volatile and/or volatile RAM (random access memory), cache memory, NAND-based flash memory, long term storage (e.g., hard drive), and/or read only memory. The one or more I/O interfaces 120 may include interfaces through which a user may interact with the computing system 100. The display(s) 176 may be a touchscreen, flatscreen, monitor, television, projector, as examples.

In an exemplary embodiment, a user interacts with the security analysis tool 140 through the UI 180 on the display 176 in an exemplary embodiment or through the network interface(s) 130 in another non-limiting embodiment. The external device(s) 190 enable a user to interact in one exemplary embodiment with the computing system 100 and may include a mouse, trackball, keyboard, and the like. The network interfaces 130 may be wired and/or wireless and may implement a number of protocols, such as cellular or local area network protocols. The elements in computing system 100 may be interconnected through any technology, such as buses, traces on a board, interconnects on semiconductors, and the like.

In this example, the security analysis tool 140 includes a static analysis tool 150 that performs an analysis A (e.g., static analysis 201 described below in reference to FIGS. 3 and 4). The analysis A comprises a static analysis of a program; that is, an analysis of a program performed without executing the program and, instead, performed by analyzing the code (e.g., source, object code) of the program and modeling operation of the program. As an example, the security analysis tool 140 includes a data flow engine 165 that performs, at least in part, building reusable function summaries for frequently visited methods to optimize data flow analysis, as described below. It is noted that the separation into static analysis tool 150 and the data flow engine 165 is merely exemplary and for ease of description. Instead of this scenario, there could be simply a static analysis tool 150. Furthermore, there does not have to be a security analysis tool 140 (e.g., which could perform other analyses, such as run-time analyses) and a static analysis tool 150; instead, there could be only a static analysis tool 150. Other configurations are also possible.

In an example, the data flow engine 165, as part of a static analysis of the program 107, creates data flow solutions (Ds) 175, which map program locations L to data flow facts holding at each location. In the example of FIG. 2, an exemplary data flow solution 175-$x$ maps the program location L 190 to access paths (aps) 167, and there are y such access paths for this example. Each access path access path denotes one or more potentially tainted memory locations and is a path taken from a source of the taint to the program location L 190. Arriving at this mapping involves processing flow of data through methods, and this is where the function summaries 20 are used. In the example of the data flow solution 175-$m$, there are multiple function summaries (FS) 20. The data flow solution 175 at this point has a value (in terms of a number of function summaries) of |D| and thus there are |D| function summaries 20. This could occur if the location L 190 is at an entry point to a method, such as the toString( ) method 10 shown in FIG. 1. The data flow solution 175-$n$ shows the example of FIG. 1, where the function summaries 20-1 and 20-2 are illustrated. The data flow engine 165 can determine, through exemplary techniques described below, these function summaries 20-1 and 20-2 should be coarsened (that is, made less precise) to create the function summaries 195 with a reduced (e.g., coarser) set of access paths. In this example (and the example of FIG. 1), the function summaries 20-1 and 20-2 of o.d1=>ret and o.d2=>ret, respectively, to o.*=>ret, the function summary 195-1.

A concrete, organized description of an exemplary embodiment is now provided assuming an access-path domain. Such an access-path domain is described in O. Tripp, et al., "ANDROMEDA: Accurate and Scalable Security Analysis of Web Applications", Fundamental Approaches to Software Engineering, Lecture Notes in Computer Science Volume 7793, 2013, pp 210-225. This domain is useful for security analysis.

Figure 3:
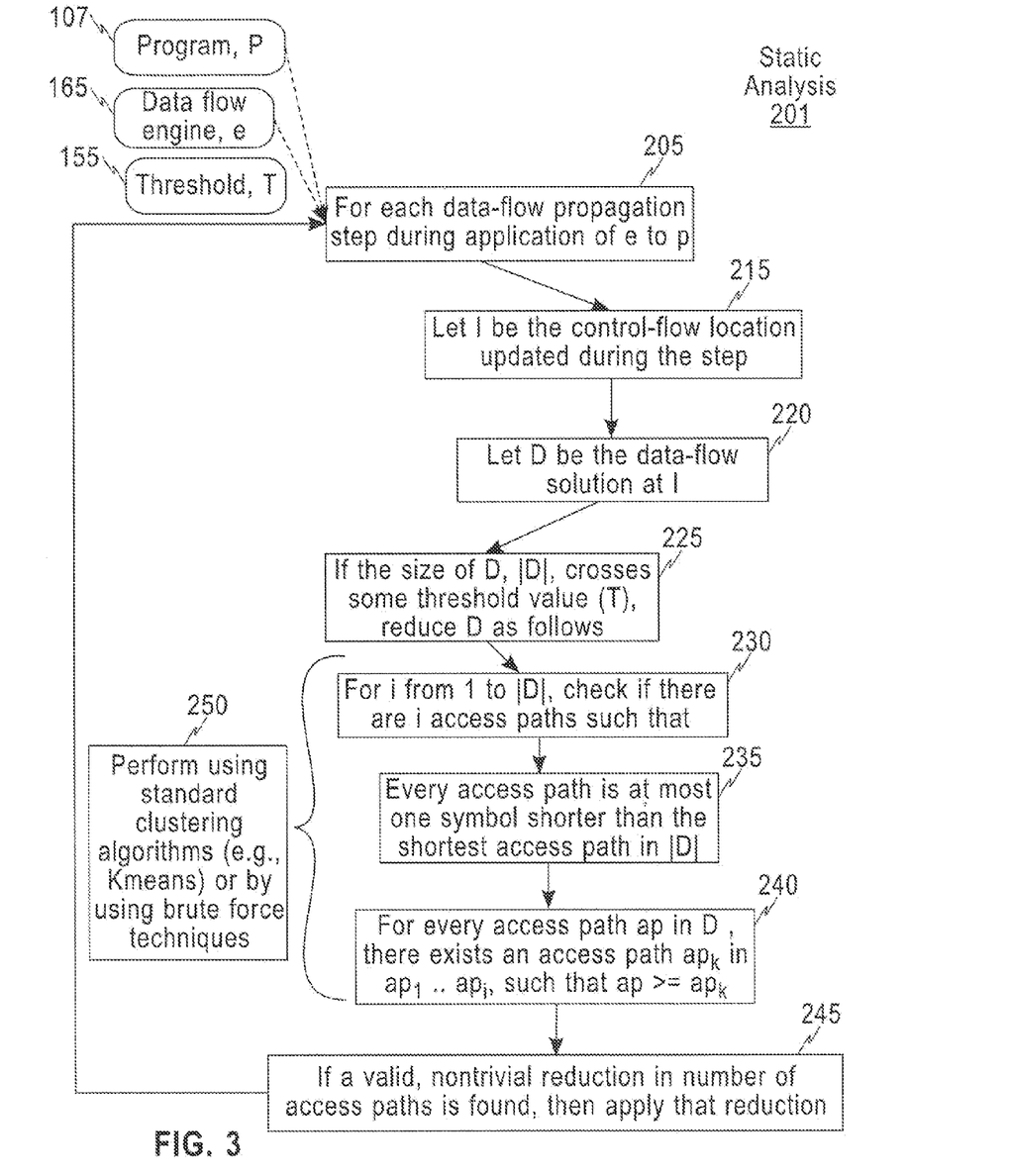
FIG. 3 is a logic flow diagram performed by a data flow engine for building reusable function summaries for frequently visited methods to optimize data-flow analysis, and illustrates the operation of an exemplary method, a result of execution of computer program instructions embodied on a computer readable memory, and/or functions performed by logic implemented in hardware, in accordance with an exemplary embodiment.

An exemplary algorithm is now presented in reference to FIGS. 3 and 4. Turning to FIG. 3, this figure is a logic flow diagram performed by a data flow engine for building reusable function summaries for frequently visited methods to optimize data-flow analysis. This figure also illustrates the operation of an exemplary method, a result of execution of computer program instructions embodied on a computer readable memory, and/or functions performed by logic implemented in hardware, in accordance with an exemplary embodiment. The blocks in FIG. 3 may be considered to be interconnecting means for performing the functions in the blocks. The blocks in FIG. 3 are assumed to be performed by the computing system 100, e.g., under control of the data flow engine 165.

The inputs are program P 107, the data-flow engine e 165, and a threshold T 155. This threshold depends on many factors (e.g., available memory, program size, analysis type, and the like. For each data-flow propagation step during application of the data flow engine e 165 to the program P 107 (block 205):

a. Let I be the control-flow location updated during the step (block 215); and     b. Let D be the data-flow solution at location L (block 220).

If the size of D, |D|, crosses some threshold value (the threshold T 155 in this example) (block 225), reduce D as follows:

a. For i from 1 (one) to |D|, check if there are i access paths, $ap_1 \ldots ap_i$, such that       i. every access path ap is at most one symbol (e.g., a component of an access path) shorter than the shortest access path in |D| (block 235); and       ii. for every access path ap in D, there exists an access path $ap_k$ in $ap_1 \ldots ap_i$, such that $ap >= ap_k$ (block 240).

Block 235 conserves precision. For instance, the meaning of "o.d.*" is all heap objects reachable through prefix "o.d", and so "o.d.*" is less precise (is more coarse) than "o.d.g.*". A result of the method in FIG. 2 is a loss of precision, but this loss is performed in a controlled way, which is by performing the loss of precision for at most one symbol shorted than the shortest access path in in |D|. Block 240 conserves soundness. Coarsening is always conservative, and so soundness is preserved. That is, one is representing the possible access paths less precisely, and so one will get a solution that is a superset of the original one, and hence sound.

As illustrated by block 250, claims 230, 235, and 240 can be performed using standard clustering algorithms, such as KMeans, or by using brute-force search techniques.

In block 245, if a valid, nontrivial reduction (that is, the number of access paths is reduced) in the number of access paths is found, then apply that reduction. Specifically, the original set of access paths (D) are replaced with the subset $ap_1 \ldots ap_i$ that were found to satisfy blocks 235 and 240. This may be considered to coarsen the access paths and therefore the summary. For instance, using the example above, one has o.*>o.d1 and o.*>o.d2. The result o.* is a coarsening of both of the original access paths.

It is noted that blocks 235 and 240 may be considered to perform determining whether the function summaries are structurally similar. Structural similarity can be achieved by directly comparing the strings of symbols which are the access paths. This is a syntactic comparison. Two access paths can then be considered similar if they differ by at most k symbols in their suffix for some parameter k. That is, within the scope of symbolic data-flow analysis, structural similarity between function summaries can be reduced to a syntactic check. Assume for example that there are two summaries, o.d1=>ret and o.d2=>ret, and these two summaries refer to fields d1 and d2 of class C. Then they are structurally similar in the sense of having the structure C. {field of C}=>ret.

A variant of the algorithm shown in FIG. 3 that reduces performance overhead is to apply the reduction periodically. However, this is a minor concern because the actual reduction is performed only if |D| crosses some threshold value.

Figure 4A:
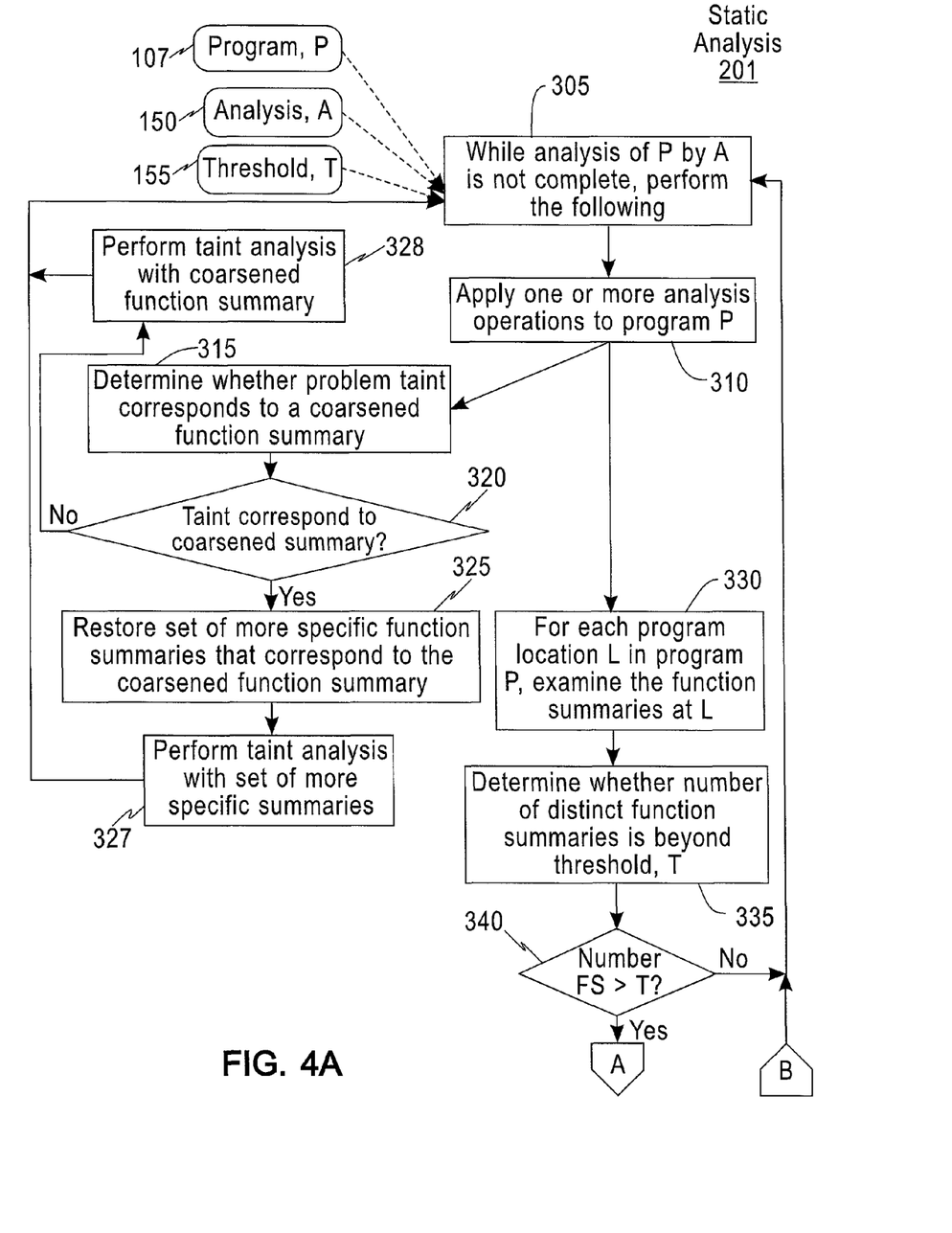
FIGS. 4A and 4B, is a logic flow diagram performed by a static analysis tool for building reusable function summaries for frequently visited methods to optimize data-flow analysis, and illustrates the operation of an exemplary method, a result of execution of computer program instructions embodied on a computer readable memory, and/or functions performed by logic implemented in hardware, in accordance with an exemplary embodiment.
Figure 4B:
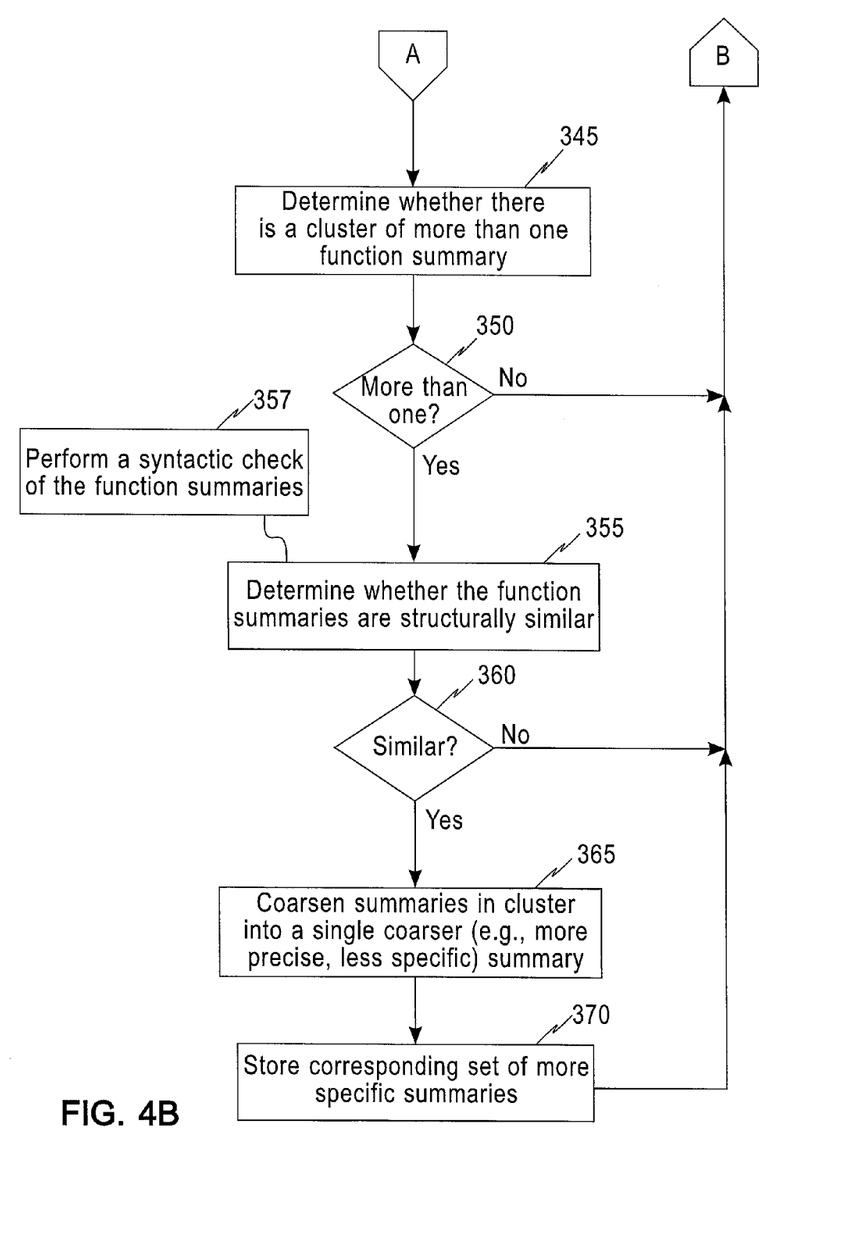

Turning now to FIG. 4, FIG. 4 includes both FIG. 4A and FIG. 4B. FIG. 4 is a logic flow diagram performed by a static analysis tool for building reusable function summaries for frequently visited methods to optimize data-flow analysis. FIG. 4 illustrates an exemplary static analysis process. FIG. 4 also illustrates the operation of an exemplary method, a result of execution of computer program instructions embodied on a computer readable memory, and/or functions performed by logic implemented in hardware, in accordance with an exemplary embodiment. The blocks in FIG. 4 may be considered to be interpreted to be means for performing the functions in the blocks.

Blocks 330-370 of FIG. 4 correspond to blocks 215-250 of FIG. 3. However, blocks 330-370 show a slightly different embodiment, as part of a static analysis 201 performed by the static analysis tool (which performs Analysis A) 150. This example assumes the computing system 100 performs the blocks of FIG. 4, under direction of the static analysis tool 150.

The program P 107, the analysis A 150 (as performed by the static analysis tool 150), and the threshold T 155 are inputs. Note that the operations performed by the data flow engine e 165 may be considered to be part of the analysis A 150. In block 304, while the analysis of the program P by the analysis A is not complete, blocks 310 to 270 are performed. In block 310, the analysis A applies one or more analysis operations to the program P 107.

As described above and as described below in blocks 335-370, an idea herein is to coarsen function summaries to improve the scalability of a static analysis 201. However, if the analysis A (e.g., 201) reports a finding, then to ensure that this finding is not a spurious artifact of the coarsening process, the analysis goes back to the relevant program points (i.e., those along the tainted flow) that underwent coarsening and restores the more precise function summaries. For instance, if a problem taint corresponds to the function summary 195-1 of o.*=>ret, the set of function summaries 20-1 and 20-2 of o.d1=>ret and o.d2=>ret, respectively would be restored.

In the example of FIG. 4, the blocks 315-327 perform these operations. Depending on how the static analysis tool 150 is defined, these blocks could be performed after some of the function summaries have been coarsened. Thus, some analysis has been performed and some function summaries have been coarsened. However, it is also possible to perform the blocks 315-327 after all of the function summaries that are able to coarsened are coarsened. Due to the many different places blocks 315-327 could occur, in the example of FIG. 4, blocks 315-327 are represented as being performed "in parallel" with blocks 330-370.

In block 315, the computing system 100 determines whether a problem taint corresponds to a coarsened function summary 195. If so (block 320=Yes), then in block 325, the set of more specific function summaries 20 that correspond to the coarsened summary 195 are restored. A taint analysis (block 327) is performed using the set of more specific function summaries 20. After block 327, then flow proceeds to block 305. If not (block 320=No), the computing system 100 performs taint analysis with the coarsened function summary (block 328). That is, the coarsened function summary 195 is used where function summaries are normally used, e.g., to determine data flow solutions 175 and the like. Function summaries are the standard approach for interprocedural analysis.

As stated above, blocks 330-370 of FIG. 4 correspond to blocks 215-250 of FIG. 3. In block 330, the computing system 100, for each program location L in program P, examines the function summaries at the program location L. The computing system 100 determines whether the number of distinct function summaries is beyond a threshold T 155 in block 335. If the number is not above the threshold (block 340=No), flow proceeds to block 305. If the number is above the threshold (block 340=Yes), it is determined in block 345 if there is a cluster of more than one function summary 20. If not (block 350=No), no function summary coarsening can be performed and the method continues in block 305. If there is a cluster of more than one function summary 20 (block 350=Yes), then coarsening may be performed and block 355 is performed.

In block 355, it is determined whether the summaries are structurally similar. As described above, blocks 235 and 240 may be considered to perform determining whether the access paths 167 in the set are structurally similar and therefore to help determine whether function summaries are structurally similar. As also stated above, structural similarity between function summaries can be reduced to a syntactic check (block 357). If the function summaries are not structurally similar (block 360=No), the flow proceeds to block 305. If the function summaries are structurally similar (block 360=Yes), in block 365, the computing system 100 coarsen summaries in cluster into a single coarser function summary 195 having coarser set of access paths 197-1. In block 370, the computing system 100 stores the corresponding set of more specific summaries 20 (i.e., corresponding to the coarser function summary 195).

FIG. 4 is described as performing a taint analysis as the static analysis 201. However, the static analysis 201 may also be a verification analysis or a transformation analysis. A verification analysis verifies a program property (as taint analysis does with the property of data flow between sources and sinks). A transformation analysis may be refactoring, or compile-time parallelization, as examples.

The techniques in FIGS. 3 and 4 are merely exemplary and other techniques may be used.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
    inspecting function summaries generated during a static analysis of a program, wherein each function summary includes an access path, wherein an access path is a path taken from a source statement to a program location;
    identifying a set of multiple function summaries for a same method that have structural similarities, wherein the multiple function summaries correspond to different access paths to a particular program location corresponding to an entry point to the method;
    replacing the set of structurally similar multiple function summaries with a single coarse summary; and
    performing subsequent static analysis operations using the single coarse summary,
    wherein the static analysis comprises a taint analysis, and wherein performing the subsequent static analysis further comprises determining a problem taint corresponds to the single coarse summary, restoring the set of multiple function summaries for the same method, and performing subsequent taint analysis using the restored set of multiple function summaries.

2. The method of claim 1, wherein the static analysis comprises verification analysis.

3. The method of claim 1, wherein the static analysis comprises a transformation analysis.

4. The method of claim 1, wherein replacing the set of structurally similar multiple function summaries with the single coarse summary further comprises replacing a set of multiple access paths with a single access path comprising an "any field" character.

5. The method of claim 4, wherein each of the set of access paths comprise an object and a field, and wherein replacing a set of multiple access paths with a single access path comprising an "any field" character further comprises replacing fields of the object's class with the "any field" character.

6. The method of claim 1, wherein identifying a set of multiple function summaries for a same method that have structural similarities further comprises performing a syntactic check on the set of multiple function summaries to determine whether the set of multiple function summaries have structural similarities.

7. The method of claim 1, further comprising comparing a number of the multiple function summaries in the set to a threshold and, in response to the number exceeding the threshold, performing the identifying the set of multiple function summaries for the same method that have structural similarities.

8. A computer-implemented method, comprising:
    inspecting function summaries generated during a static analysis of a program;
    identifying a set of function summaries for a same method that have structural similarities wherein the identifying is performed at a location in the program and wherein identifying further comprises:
        for i from one to a size of a data flow solution at the location, wherein i and size are integers and size is greater than one, check if there are i access paths, $ap_1 \ldots ap_i$, such that the following are true:
            every access path ap is at most one symbol shorter than the shortest access path in the size of a data flow solution at the location; and
            for every access path ap in the data flow solution, there exists an access path $ap_k$ in $ap_1 \ldots ap_i$, such that $ap >= ap_k$; and
        replacing further comprises replacing the data flow solution with the access paths, $ap_1, \ldots, ap_i$;
    replacing the set of structurally similar summaries with a coarse summary; and
    using the coarse summary in subsequent static analysis operations.

9. The method of claim 8, wherein replacing the data flow solution with the access paths, $ap_1 \ldots ap_i$ is performed to replace access paths in the structurally similar function summaries with the access paths, $ap_1 \ldots ap_i$.

10. The method of claim 8, wherein identifying is performed using one or more standard clustering algorithms or using brute force techniques.

* * * * *